No. 634,617. Patented Oct. 10, 1899.
C. H. HANSEN.
BRUSH.
(Application filed Sept. 6, 1898.)
(No Model.)
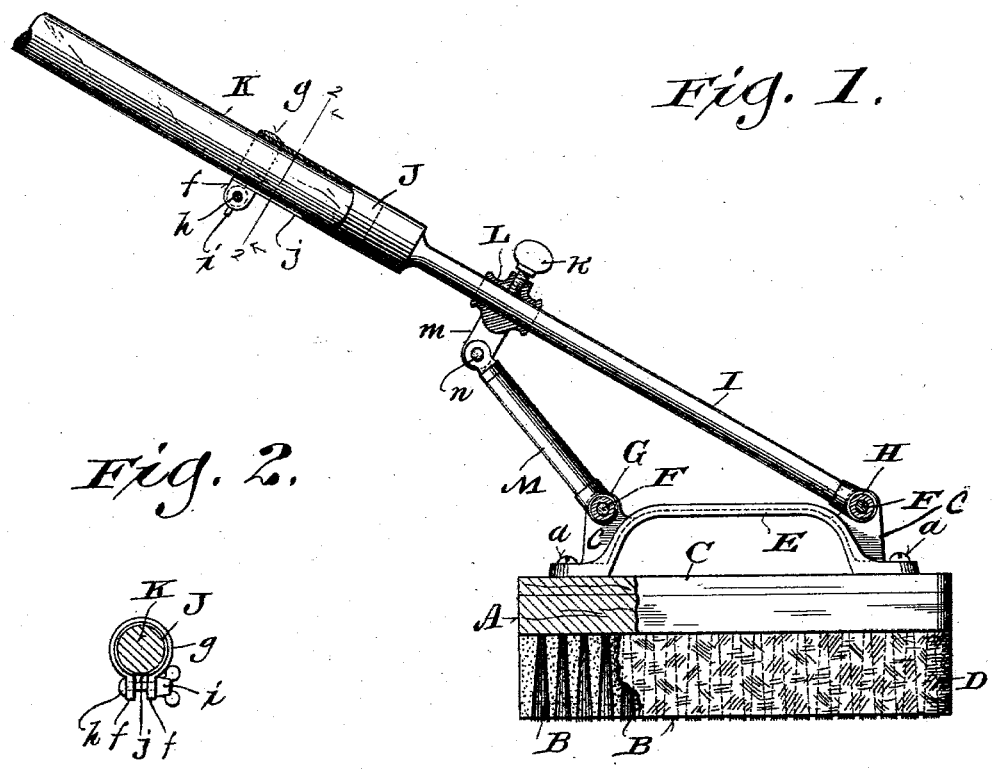
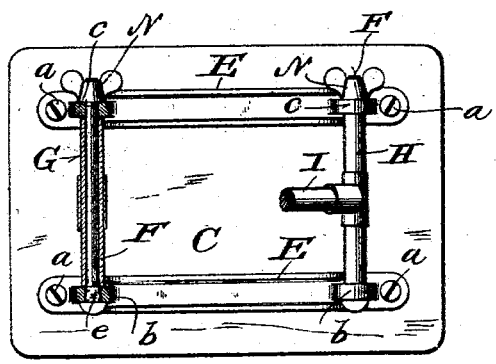
Witnesses:
Geo. W. Young,
B. C. Roloff
Inventor:
Charles H. Hansen
By H. G. Underwood
Attorney

UNITED STATES PATENT OFFICE.

CHARLES H. HANSEN, OF RACINE, WISCONSIN.

BRUSH.

SPECIFICATION forming part of Letters Patent No. 634,617, dated October 10, 1899.

Application filed September 6, 1898. Serial No. 690,270. (No model.)

*To all whom it may concern:*

Be it known that I, CHARLES H. HANSEN, a citizen of the United States, and a resident of Racine, in the county of Racine and State of Wisconsin, have invented certain new and useful Improvements in Brushes; and I do hereby declare that the following is a full, clear, and exact description thereof.

My invention relates especially to that class of brushes which are employed in scraping and smoothing the interior surfaces of tanks and vats used in breweries, distilleries, vinegar-factories and similar establishments; and it consists in certain peculiarities of contruction and combination of parts, as will be fully set forth hereinafter and subsequently claimed.

In the drawings, Figure 1 is a side elevation of a brush embodying my present invention, parts being shown in section or broken away to better illustrate certain details of construction. Fig. 2 is a detail sectional view on the line 2 2 of Fig. 1. Fig. 3 is a plan view with the adjustable handle and its attachments partly broken away or in section.

Referring to the drawings, A represents the back of a brush, through which bunches of wires B B are passed in the usual manner of making a wire brush, the said back being supplemented with a covering-plate C. The brush is placed back down in a frame or casing closely fitting the same and of a height equal to that of the brush. I next form a mixture by adding a pound of litharge to a quart of boiled linseed-oil and stir in a sufficient quantity of ground emery or carborundum or other granular substance until the whole mass is of the consistency of a soft paste, and pour this mass into the frame or casing until the whole brush is covered thereby, as shown at D, Fig. 1, into a solid cake, with the ends of the wires slightly projecting therethrough, if desired, and let the mass harden for about twenty-four hours and then remove the frame or casing. Ordinarily I prefer to let the extreme ends of the described bunches of wire slightly project through the cake, as shown; but for some work I would grind off the brush flat, thus getting a solid brush for scraping or planing surfaces. The chief object of this treatment of the brush is to keep the tufts of wires stiff and rigid, so that they will scrape the surface to which they are applied instead of being bent over, so as to merely rub the same, and I can accomplish this rigidity by using, say, plaster-of-paris for the filling agent; but I prefer sharp granular material, such as ground emery or carborundum, (or even pulverized glass or sand from a foundry rattle-box or the like,) because this sort of filling is useful as always aiding in the described scraping action of the brush.

E E represent two loops secured, as by screws $a\,a$, to the brush-back plate C, these screws being of suitable length to unite the plate C to the brush-back proper, A, if desired, and said loops E E are formed with flanges or webs $b\,b$ and $c\,c$ at the ends thereof. The flanges $b\,b$ on one of the loops are perforated with square holes to receive the squared portions $e$ next to the heads of headed bolts F F, while the flanges $c\,c$ on the other loop are provided with round holes to admit the passage therethrough of the screw-threaded ends of said bolts, which have rounded shanks, as shown, and which bolts are held in place by nuts N N. G H are sleeves fitting upon the said rounded shanks of the bolts F F between the flanges $b\,c\,b\,c$ of the loops E E, and brazed or otherwise rigidly secured to the sleeve H is a rod I, terminating in a socket J for the reception of a handle or pole K, held in place by means of the lugs $f\,f$ on a split ring $g$ on the outer end of the socket J, headed screw-bolt $h$, and thumb-nut $i$, the said socket being split or cut out, as shown at $j$, to permit the said lugs $f\,f$ to be drawn together by the nut $i$, and thus securely clamp the end of the handle or pole K within the socket J.

L is a sliding sleeve upon the rod I, held in place thereon, at the desired point to which it has been adjusted, by the set-screw $k$ (which is preferably a thumb-screw) and having a depending fork $m$ (only one furcation of which is shown in Fig. 1) to receive the flattened upper end of a short rod M, pivoted thereto, as shown at $n$, the other end of said rod M being brazed or otherwise secured to the sleeve G.

The operation of my device will be readily understood from the foregoing description of its construction, taken in connection with the accompanying drawings. When it is desired to vary the angle at which the brush is set, the thumb-screw $k$ is loosened and the sleeve L moved on the rod I the proper distance in the required direction until the desired inclination of the brush is accomplished, when the screw $k$ is tightened again. Similarly by loosening the thumb-nut $i$ the handle or pole K may be released from the socket J and removed and one of greater or less length substituted therefor and clamped to place in the manner already described. This will be found particularly useful in scraping the interiors of tall vats or tanks, when from time to time as the work progresses after the upper part has been scraped handles or poles of shorter lengths would be more conveniently employed, till finally when near the bottom of the vat or tank both the nuts N N (which are also preferably thumb-nuts) are removed and the bolts F F then withdrawn, so that the described adjustable handle and attachments G H I J K L M can all be removed to enable the workman to finish his task of scraping by the use of the loops E E as handles.

While I have illustrated my invention in connection with a flat brush, it will be understood that so far as the described filling and stiffening of the scraping-tufts is concerned it is equally applicable to round revolving brushes or to one having other than wire tufts and that my described adjustable handle may be applied to the supporting-frame of a revolving brush or to the back-plate of a brush of any kind or of any other than the flat form shown.

Having thus described my invention, what I claim as new, and desire to secure by Letters Patent, is—

1. A brush comprising an inflexible back having a series of flexible tufts secured thereto and projecting from one side thereof, the spaces between the said tufts being filled with hardened plastic material.

2. The combination with a brush of a pair of revoluble sleeves connected to the backing or frame of the brush, a pair of rods secured to said sleeves, a sliding sleeve on one rod pivotally connected to the other rod, and means for holding said sliding sleeve in its adjusted position.

3. The combination with a brush of a pair of removable bolts connected to the backing or frame of the brush, sleeves revoluble on said bolts, a pair of rods secured to said sleeves, a sliding sleeve on one rod pivotally connected to the other rod, and means for holding said sliding sleeve in its adjusted position.

4. The combination with a brush of a pair of loops secured to the backing or frame of the brush, removable bolts connecting said loops, sleeves revoluble on said bolts, a pair of rods secured to said sleeves, a sliding sleeve on one rod pivotally connected to the other rod, and means for holding said sliding sleeve in its adjusted position.

5. The combination with a brush of a pair of rods of unequal length pivotally secured to the backing or frame of the brush, a sliding sleeve on one rod pivotally connected to the other rod, means for holding said sleeve in its adjusted position, a pole-socket secured to the longer rod, a handle or pole, and means for removably clamping the latter in place within said socket.

In testimony that I claim the foregoing I have hereunto set my hand, at Milwaukee, in the county of Milwaukee and State of Wisconsin, in the presence of two witnesses.

CHARLES H. HANSEN.

Witnesses:
H. G. UNDERWOOD,
N. E. OLIPHANT.